Patented Apr. 15, 1930

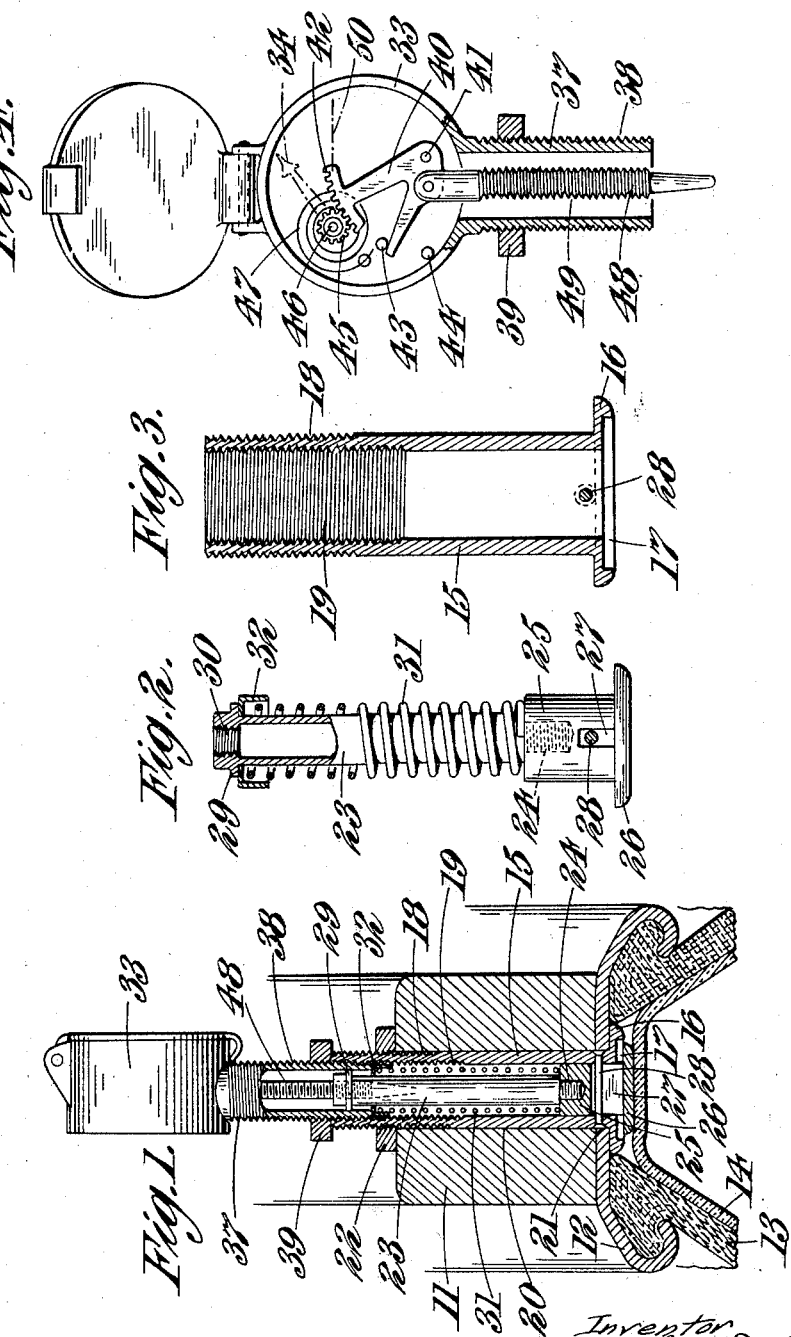

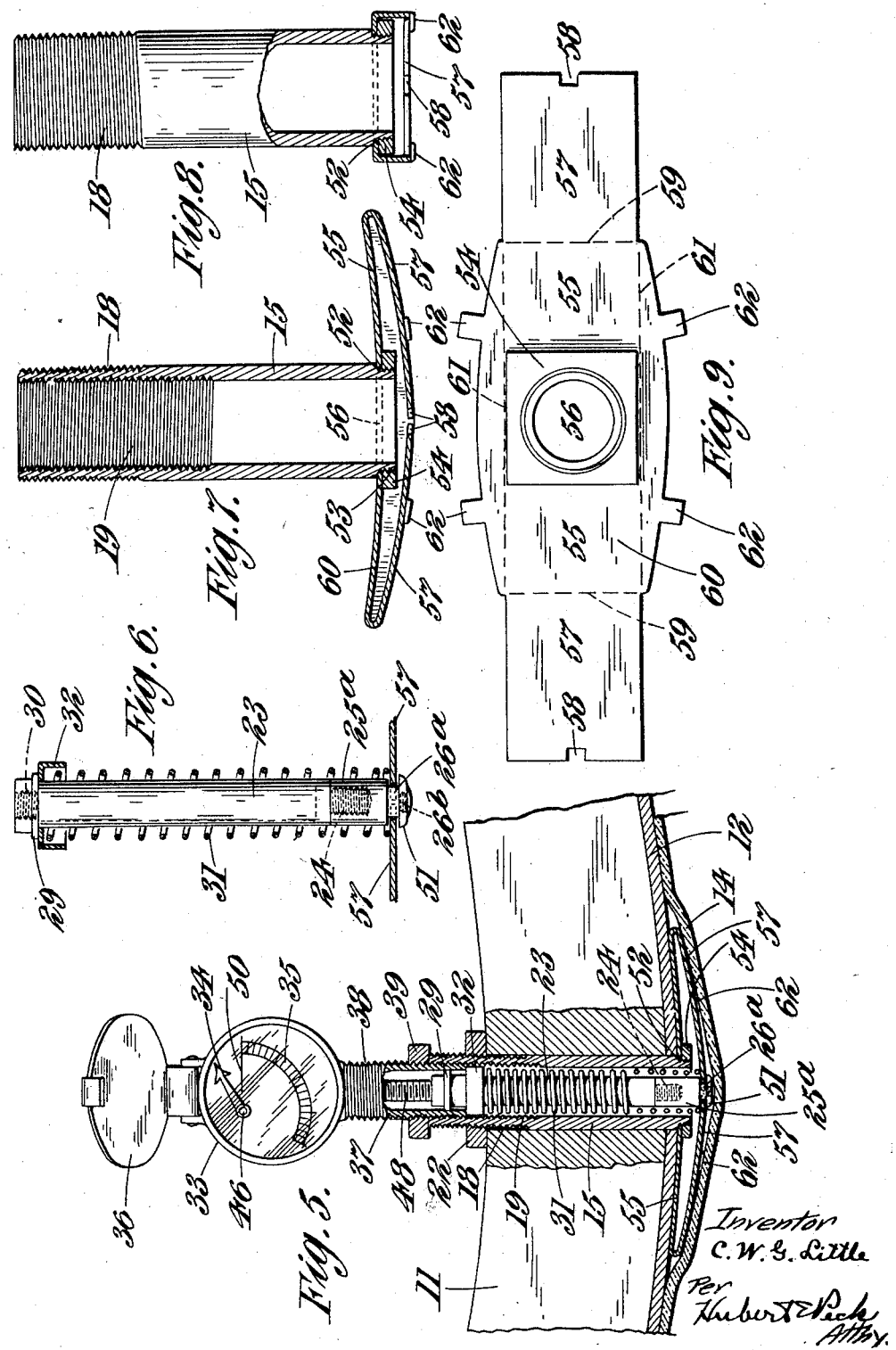

1,755,010

UNITED STATES PATENT OFFICE

CHARLES WILLIAM GODSON LITTLE, OF ENFIELD, ENGLAND

PRESSURE-INDICATING DEVICE FOR USE WITH PNEUMATIC TIRES

Application filed November 10, 1927, Serial No. 232,365, and in Great Britain May 27, 1927.

This invention has relation to pressure indicating devices for pneumatic tires and has for its object to provide a device which is permanently mounted on a wheel of a vehicle and gives a visual indication of the pressure within the air tube of the pneumatic tire without pneumatic connection with the air tube. The invention also has for an object to provide a device which is easily calibrated.

Referring to the accompanying drawings:—

Fig. 1 is a sectional view of one embodiment of the invention;

Fig. 2 is a sectional elevational view of the gauge actuator and its spring removed from their container;

Fig. 3 is a sectional view of the container for the gauge actuator and its spring;

Fig. 4 is a part sectional elevational view showing, to some extent diagrammatically, the gauge and its mechanism, the three last mentioned figures being to a larger scale than Fig. 1.

Fig. 5 is a similar view to Fig. 1, but viewed at right angles thereto, of a preferred and modified construction of indicating device;

Fig. 6 is a sectional elevational view of the gauge actuator and its spring removed from their container, this and the remaining figures being to a larger scale than Fig. 5;

Figs. 7 and 8 are sectional views at right angles to one another of the container for the gauge actuator and its spring, and also showing a second spring which bears on the air tube of the pneumatic tire;

Fig. 9 is a developed view of the second spring.

Referring to Figs. 1 to 4 inclusive:—

11 is the felloe and 12 is the rim of a wheel. 13, 14 are, respectively, the outer cover and the air tube of the pneumatic tire with which the wheel is shod.

15 is a tube having at one end a circular flange 16 which, on its underface, is circularly recessed as indicated at 17. The tube 15 from its other end has external and internal screw threads 18, 19 respectively. The felloe 11 and rim 12 have holes 20, 21 respectively. These holes 20, 21 are disposed coincidently and through them the tube 15 is passed until its flange 16 contacts with the outer periphery of the rim 12. The tube 15 is held in this position by a nut 22 which is screwed on to the external screw threads 18 and against the felloe 11. The tube 15 constitutes a container for a gauge actuator 23 and its spring 31 and also a carrier 37 for a gauge 33.

The gauge actuator comprises a hollow rod or tube 23 which is closed at one end and at such end has a screw threaded extension or pin 24 on which is mounted a boss or head 25. Integral with the boss or head 25 is a plate 26 that constitutes a pressure plate and which, when the parts of the device are assembled and the device is mounted on the wheel, contacts with the air tube 14. The boss or head 25 immediately adjacent the pressure plate 26 has a transverse slot 27 through which a pin 28 extends. The pin 28 is mounted at its ends in the wall of the tube 15. The arrangement is such that while the gauge actuator 23 is permitted a limited longitudinal movement in the tube 15, it is constrained against movement in a rotary sense. Further, the pressure plate 26 of the gauge actuator is such that when the gauge actuator 23 is in its most inward position, it is contained within the recess 17 of the flange 16 of the tube 15. Mounted on the open end of the rod or tube 23 is a member 29 which constitutes a collar and is screw threaded internally, the screw threads 30 being of the same pitch as the internal screw threads 19 of the tube 15. When the parts of the device are assembled, the collar 29 is contained within an appurtenant part of the gauge and acts to guide and steady the movements of the gauge actuator.

The spring 31 contained within the tube 15 encircles the gauge actuator 23, bears at one end against the boss or head 25 and at the other end is embraced by a circular cup shaped washer 32 which can slide freely on the gauge actuator 23. The spring 31, in its unstressed condition is of a length to extend between the boss or head 25 and the collar 29. The spring 31 is passed on to the gauge actuator 23 by unscrewing the boss or head 25 from the pin or extension 24.

The gauge comprises a circular casing 33 containing mechanism hereafter described by which a pointer 34 is moved over a scaled dial 35 (see Fig. 5). The pointer 34, dial 35 and glazing are protected by a lid or cover 36 which is hinged to the casing 33. The casing 33 has a tubular extension 37 with external screw threads 38 of the same pitch as the internal screw threads 19 of the tube 15. The extension 37 is such that it can be screwed into the tube 15 and when so mounted it is held by the screwing of a lock nut 39 mounted on its screw threads 38 against the end of the tube 15. When the extension 37 is screwed into the tube 15, it is entered by the gauge actuator 23, the collar 29 of which contacts freely with the inner wall of the extension 37: as a result the gauge actuator 23 is guided and steadied in its movements.

The gauge mechanism consists of a cranked lever 40 pivotally mounted at 41 within the gauge casing 33. The lever 40 has at one end a toothed sector 42 and its other end extends and is movable between two pins 43, 44 mounted on the rear wall of the casing 33. The pins 43, 44 limit the movements of the lever 40 in either direction. The toothed sector 42 meshes with a pinion 45 on the spindle 46 of which the pointer 34 is mounted. The pinion 45 is under the influence of a clock-type spring 47 which tends to cause the pointer 34 and lever 40 to assume the positions in which they are shown in Fig. 4. The gauge mechanism is connected with the gauge actuator 23 by a rod 48 which is pivotally connected at one end to the cranked lever 40 and extends through the extension 37. The rod 48 is of such length that its free end extends beyond the free end of the extension 37. The rod 48 is screw threaded for a portion of its length, the screw threads 49, which are of the same pitch as the screw threads 30 of the collar 29 of the gauge actuator 23, commencing in the plane of the free end of the extension 37.

In the preferred and modified construction shown in Figs. 5 to 9 inclusive, greater sensibility is obtained by the interposition of a flat spring or springs, which constitute a pressure plate, between the gauge actuator 23 and the air tube 14. In this modification, the pressure plate 26, the boss or head 25 and the pin 28 are omitted and there is substituted for the boss or head 25 a member 25$^a$ of the same diameter as the gauge actuator 23 and having a squared extension 26$^a$ terminating in a screw threaded portion 26$^b$ on which a nut 51 is mounted. The flange 16 on the tube 15 is also omitted and in lieu thereof the tube 15 is reduced in external diameter at its end, to form a shoulder 52; the portion of reduced diameter is provided with a screw thread 53 on which a nut 54 is mounted. 55 is a plate of spring metal which is cut to the shape shown in Fig. 9. The plate 55 is provided with a central orifice 56 of a size to permit the plate to be passed on to the end of the tube 15 and against the shoulder 52 in which position it is secured by the nut 54. The two end portions 57 of the plate 55 are cut away as indicated at 58 and are bent along the dotted lines 59 so as to extend under the central portion 60, the longitudinal edges of which portion are bent downward along the dotted lines 61 until they are at right angles to said portion. A trough shaped member as shown in Fig. 8 is thus formed and contains the bent under portions 57, which, in use, constitute a combined pressure plate and spring (hereinafter referred to as a spring pressure plate). 62 are lugs on the longitudinal edges of the central portion 60; these lugs 62 are bent so as to extend under the spring pressure plates 57. Each spring pressure plate 57 is connected to the gauge actuator 23, the squared extensions 26$^a$ of which is loosely received in the notches 58 of the plates. The engagement of the spring pressure plates 57 with the extension 26$^a$ is ensured by the nut 51. The gauge actuator 23 is thus connected with the spring pressure plates 57 and is permitted a limited longitudinal movement but is constrained against movement in a rotary sense. The lugs 62 and nut 54 constitute stops to limit the movements of the spring pressure plates 57 in either direction.

In the preferred and modified construction the spring pressure plates oppose the pressure within the air tube and by suitable design any desired percentage of the force exerted by the air tube on the actuator may be taken up thereby. This enables the spring 31 to be made lighter and thereby improves the accuracy of the indications of the pointer 34.

When the indicating device is to be applied to a wheel, the tube 15 with gauge actuator 23 therein is passed through the holes 21, 20 in the rim and felloe 12, 11 respectively and is secured by the nut 22 in cooperation with flange 16 or, in the case of the preferred construction, the central portion 60 of the plate 55, contacting with the outer periphery of the rim 12. The tire, which has been wholly or partly removed to permit the fitting of the tube 15 with gauge actuator 23 and appurtenant parts, is now replaced and the air tube 14 is inflated to the desired pressure. The pneumatic pressure within the air tube 14 acts through the wall thereof on the pressure plate 26 or the spring pressure plates 57 and the gauge actuator 23 is held in its most inward position, that is, with the pressure plate 26 in the recess 17 of the flange 16, or the spring pressure plates 57 pressed against the nut 54. The extension 37 of the gauge 33 is now screwed into the tube 15, the rod 48 at the same time passing through the collar 29 into the gauge actuator 23. Engagement of the screw threads 49, 30 of the rod 48 and collar 29, respectively, does not take place until the free end of the extension 37 contacts with the cup washer 32 of the spring 31. The further screwing of the extension 37 into the tube 15 depresses the cup washer 32 and compresses the spring 31, but the simultaneous screwing in of the rod 48 into the collar 29 prevents any effect on the gauge mechanism until the compression on the spring 31 overcomes the pneumatic pressure on the pressure plate 26 or the spring pressure plates 57. When this occurs, the gauge actuator 23 moves outward of the tube 15 and moves the pointer 34 in relation to the dial 35 through the rod 48. The screwing in of the extension 37 is continued until the pointer 34 occupies a position such as that indicated by the line in Figs. 4 and 5. This position, which is preferably and as shown, at right angles to the axis of the gauge actuator 23, constitutes the calibration mark of the gauge for the desired pressure in the air tube 14. When in course of time the pneumatic pressure decreases, the spring 31 or in the case of the preferred construction, the spring pressure plates 57, cause the gauge actuator 23 to move endwise and outward of the tube 15 and such movement causes the pointer 34 to move clockwise of the dial 35. Restoration of the pressure within the air tube 14 causes the pointer 34 to return to the calibration position 50 on the dial 35, the inflation of the tire at such position being at the desired pressure.

When applying the indicating device to a wheel provided with a removable rim, the tube 15 with its attachment as before described is mounted in the rim when the rim is detached from the wheel. The rim is then applied to the wheel in the usual way but the hole through the felloe for receiving the tube 15 is suitably elongated and located as near to the hole for the air valve stem as the spacing of the spokes permits.

Instead of calibrating the indicating device by means of a known pressure in the air tube 14, the indicating device may be initially calibrated for any desired pressure. When so calibrated and mounted on the wheel with the air tube 14 deflated, the movement of the pointer 34, on inflation of the air tube, to a predetermined position is an indication that the tire is inflated to the desired pressure. This modification in the use of the indicating device is carried out by so designing the springs 31, 57 that when the extension 37 is screwed into the tube 15 to a predetermined position and the springs 57 are compressed to the position they occupied when the pointer 39 was on the line 50 (Fig. 4) the air tube is inflated to the desired pressure. In the modified use of the indicating device the spring 47 is required to control the pointer 34 in the opposite sense. The application of the indicating device to a wheel is as before described with the exception that the air tube 14 is not inflated until the assembling of the parts is complete with the extension 37 of gauge 33 screwed to the predetermined position in tube 15. As the air tube 14 is in its deflated condition, the springs 57 will be pressing against the stops 62 and the gauge actuator 23 will be held in its most outward position. If the air tube 14 be now inflated, the pointer 34 will move in a counter clockwise direction when the pressure in the air tube is sufficient to compress the springs and when the pointer 34 arrives at, say, line 50 (Fig. 4) it will indicate that the air tube has been inflated to the desired pressure. A fall of pressure will be indicated by clockwise movement of the pointer 34. The calibration of the device may be modified as desired by screwing the extension 37 more or less into the tube 15.

What I claim is:—

1. A pressure indicating device for use on wheels shod with pneumatic tires comprising a gauge having a tubular extension, a tubular carrier to receive the gauge extension and adapted to be permanently mounted on the wheel, a gauge actuator contained within the carrier, means whereby said actuator is connected at one end with the gauge mechanism and means at the other end having a pressure plate to contact with the air tube of the tire, and a spring encircling said actuator and adapted to be compressed against said last mentioned means by the tubular extension when entered into the carrier.

2. A pressure indicating device for use on wheels shod with pneumatic tires comprising a gauge having a tubular extension, a tubular carrier adapted to be permanently mounted on the wheel and into which the gauge extension is screwed, a rod within the gauge extension and a gauge actuator contained within the carrier, said rod and actuator having a screw threaded connection at their meeting ends and means at the other end of the actuator having a pressure plate to contact with the air tube of the tire, a spring encircling said actuator and adapted to be compressed by the tubular extension when screwed into the carrier, the interengaging screw threads of the extension and carrier and those connecting the actuator with the rod being of similar pitch.

3. A pressure indicating device for use on wheels shod with pneumatic tires comprising a gauge having an exteriorly threaded tubular extension, an interiorly threaded tubular carrier adapted to be permanently mounted on the wheel, and into which the gauge extension is screwed, a rod within the gauge extension and a gauge actuator within the tubular carrier, said rod and actuator having an end to end screw threaded connection, means including a pressure plate on the free end of the gauge actuator and spring contained within the carrier and adapted to be compressed against said last named means by the screwing of the gauge extension into the carrier, the screw threads of the several connections being of similar pitch and acting to defer movement of the gauge needle until the resiliency of the spring is overcome by the pressure on the pressure plate.

4. A pressure indicating device for use on wheels shod with pneumatic tires comprising a gauge having a tubular lateral extension, a gauge carrier adapted to be mounted on the wheel and containing a spring and a gauge actuator, means including a pressure plate to contact with the air tube and mounted on the gauge actuator, a rod within the gauge extension to couple the gauge actuator and gauge mechanism, the coupling of the gauge extension with the gauge carrier and of the rod with the gauge actuator being by screw threads of similar pitch and the gauge extension being adapted, when screwed into the carrier, to act on and compress the spring within the gauge carrier against the means on the gauge actuator to set up a differential movement between the rod and its containing extension.

5. A pressure indicating device for use on wheels shod with pneumatic tires comprising a gauge, a carrier therefor adapted to be permanently mounted on the wheel and containing a spring and a gauge actuator, a rod within the carrier connecting the actuator with the gauge mechanism, and an elongated spring plate, to the central portion of which the actuator is connected, the plate having its ends bent backward and under the central portion.

Dated this 21st day of October, 1927.

CHARLES WILLIAM GODSON LITTLE.